US006967938B1

(12) United States Patent
Kang et al.

(10) Patent No.: US 6,967,938 B1
(45) Date of Patent: Nov. 22, 2005

(54) IN-BUILDING CODE DIVISION MULTIPLE ACCESS WIRELESS SYSTEM AND METHOD

(75) Inventors: Chol Su Kang, Fremont, CA (US); Sang Kyoon Hyun, Santa Clara, CA (US); Ki Hyun Joo, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/557,666

(22) Filed: Apr. 25, 2000

(51) Int. Cl.[7] ............................................... H04B 7/216

(52) U.S. Cl. ....................... 370/335; 370/331; 370/315

(58) Field of Search ............................... 370/331, 332, 370/333, 334, 335, 336, 337, 338, 274, 293, 370/315, 320; 455/437, 442, 443, 447, 436

(56) References Cited

U.S. PATENT DOCUMENTS 5,912,921 A * 6/1999 Warren et al. .............. 375/220
6,321,090 B1 * 11/2001 Soliman ..................... 455/440
6,374,079 B1 * 4/2002 Hsu .......................... 455/11.1
6,459,725 B1 * 10/2002 Baker et al. ................ 375/214
6,526,034 B1 * 2/2003 Gorsuch ..................... 370/338
6,542,754 B1 * 4/2003 Sayers et al. ............... 455/502
6,600,734 B1 * 7/2003 Gernert et al. .............. 370/352
6,633,554 B1 * 10/2003 Dalal ......................... 370/331

* cited by examiner

*Primary Examiner*—Duc Ho
*Assistant Examiner*—Thien D. Tran
(74) *Attorney, Agent, or Firm*—Baker Botts L.L.P.

(57) ABSTRACT

A wireless office communication system including a wireless internet base station (WIBS) encompassing a base station controller, a mobile switch controller, and an ethernet interface module for coupling the WIBS to an existing internet protocol (IP) based network. The interface module provides for coupling the WIBS to an ethernet back-bone, a mobile communication unit and a public switch telephone network (PSTN). In one embodiment, the wireless communication system includes a wireless internet server which also encompasses base station controller and mobile switch controller functions to enable the wireless communication system to manage call mobility with the system. In one embodiment, communication between the WIBS and the PSTN is in an IP data protocol format. The WIBs provides control and sequencing of all call control operations by handling both voice and data calls which are transmitted over the ethernet back-bone to the PSN or the internet.

39 Claims, 10 Drawing Sheets

IN-BUILDING CODE DIVISION MULTIPLE ACCESS WIRELESS SYSTEM AND METHOD

FIELD OF THE INVENTION

The present invention relates generally to the field of wireless communication systems. More particularly, the present invention relates to code division multiple access communication systems.

BACKGROUND OF THE INVENTION

Communication systems that utilize coded communication signals are well known in the art. One such system is a code division multiple access (CDMA) cellular communication system such as set forth in the Telecommunications Industry Association/Electronic Industries Association International Standard (TIA/EIA IS-95), hereinafter referred to as 15-95. In accordance with the IS-95, the coded communication signals used in CDMA systems comprise CDMA signals' that are transmitted in a common 1.25 MHz bandwidth to base stations of the system from mobile or wireless communication units, such as cell phones, portable wireless computers, or wireless handheld devices, that are communicating in a specific coverage area of the base station. In conventional CDMA systems, the base station communicates with abase station controller which allows the communication unit to communicate with other communication units within the same coverage area. Each CDMA signal includes a pseudo-noise (PN) sequence associated with a particular base station and an identification number of a communicating communication unit.

Typically, the base station controller is connected to a mobile switching controller (MSC) which allows a base station to connect with other base stations outside its coverage area in order to allow a communicating communication unit to communicate with other units outside its coverage area.

FIG. 1 illustrates a conventional CDMA communication system 100 including a first base station 110, a second base station 120, and one or more communication units 105, 106. The communication system 100 illustrated in FIG. 1 is an exemplary CDMA system which includes a direct sequence CDMA cellular communication system, such as that set forth in TIA/EIA IS-95.

In the system shown in FIG. 1, the base stations 110 and 120 are connected to a base station controller (BSC) 130 and a mobile switching controller 140 which is in turn connected to the public switched telephone network (PS TN) 150 using known techniques.

The system shown in FIG. 1 further connects to the public land mobile network (PLMN) to allow mobile communication units to travel from one network to another roaming while maintaining a subscriber profile information. A detailed illustration of the PLMN is shown in FIG. 1B. In the system shown in FIG. 1B, a conventional cellular (or PCS) wireless communication network is shown. In the network shown in FIG. 1B, a network subscriber's profile information is typically stored and maintained in a home location register (HLR). One HLR is typically required per service provider.

Typically when a new subscriber is activated, the service profile such as the subscriber's charging rate and service restrictions (e.g. no international call allowed) are included in the profile. The service profile of all communication units within a network is stored in the HLR located in the home network of the communication unit. Since a user in one cellular (or PCS) network can move into another network and use services within that network, communication exists between networks to share service profiles. For example, if a subscriber subscribing services from a service provider in a particular state (e.g. GTE mobile services in State 1) travels to another state with a different service provider (e.g. CellularOne in State 2) and attempts to make a call in State 2, the cellular system in State 2 will query the HLR in State 1 for the service profile of the network user.

This type of inter-networking communication is carried out using ANSI-41D mobile application protocol. The conventional cellular network uses ANSI-41D protocol on top of SS7 transport protocol to handle all inter-networking communications. These inter-networking communications are very costly and inflexible. The SS7 interface card, which enables the inter-networking communication, can cost upwards of $10,000. The SS7 interface card also has some configuration inflexibility due to the proprietary nature of the interface cards.

Still referring to FIG. 1, when a communication unit initiates a call sequence to either one of the base stations 110 or 120 within a coverage area, an end-to-end connection is established between the respective base station, the base station controller 130, and the MSC 140 using known CDMA call setup techniques. The base stations 110 and 120 typically communicates with the BSC 130 and the MSC 140 via communication links, such as a T1 connection. Base stations 110 and 120 typically have antennas to define the coverage area within which either base stations primary accommodate the communication units.

In the system shown in FIG. 1, when a communicating communication unit initiates a call sequence (uplink) to the nearest base station, the call is assigned to the target communication unit via the BSC 130 and the MSC 140 within a prescribed bandwidth (e.g. 1.25 MHz for 15-95).

In conventional CDMA systems, voice quality is degraded as more subscribers originate calls over the system, and as a communicating communication unit strays further away from its base station. Although, voice degradation can sometimes be acceptable to a user using the communicating communication unit because the user can always repeat an earlier transmitted message, data communication is more susceptible to degradation. This is because, in the case of data degradation, the sender of the data does not know at what point that data being sent by a communicating communication unit begins to degrade or is lost. Consequently, if data transmission begins to degrade or is lost, the communication unit will have to resend the entire data. Such retransmission can be costly.

Also, in the conventional CDMA system shown in FIG. 1, communication between a communicating communication unit and the base station requires a dedicated end-to-end connection between the base station, the base station controller, and the mobile switching controller. Such dedicated end-to-end connection can also be very expensive and time consuming.

Another problem with the conventional system described in FIG. 1 is that the communication interface between the base station and the base station controller requires proprietary interface technology which makes scaling the system to other communication platforms very cumbersome and expensive.

Furthermore, most of these conventional CDMA communication systems utilize a T1 or E1 communication pathway which have bandwidths of 1.544 Mbps for T1 connections and 2.04 Mbps for E1 connections, and are not known to handle data bursts and therefore are very slow for the transmission of data.

To alleviate some of the problems of the prior art, some prior art CDMA systems such as illustrated in FIG. 2 use multicarrier base stations to handle multiple calls and handoffs to and from the base stations. In this system, a communicating communication unit is able to utilize different carriers in the base station for transmitting and receiving calls.

Although such multicarrier systems may alleviate the problems with voice quality degradation, they do not handle data transmission very well. Thus, these prior art solutions do still have problems with the quality of data calls transmitted with a coverage area from the base stations.

In the exemplary CDMA system shown in FIG. 1, each base station transmits a pilot signal having a common PN spreading code that is offset in code phase from the pilot signal of other base stations within the system. During system operation, the mobile communication unit is provided a list of code phase offsets corresponding to neighboring base stations surrounding the base station through which communication is established. The mobile unit is equipped with a searching function which allows the mobile unit to track the signal strength of the pilot signal from a group of base stations including the neighboring base stations.

Various methods exist for switching the mobile communication unit from one base station to another (typically known as 'handoff'). One such method is termed a "soft" handoff, in which communication between the mobile unit and the end user is uninterrupted by the eventual handoff from an original base station to a subsequent base station. In other words, communication with the subsequent base station is established before terminating communication with the original base station. When the mobile unit is communicating with two base stations, a single signal for the end user is created from the signals from each base station by a communication system controller.

Mobile unit assisted soft hand off operates based on the pilot signal strength of several sets of base stations as measured by the communication unit. An Active Set is the set of base stations through which active communication is established. A Neighbor Set is a set of base stations surrounding an active base station comprising base stations that have a high probability of having a pilot signal strength of sufficient level to establish communication.

When communications are initially established, the communication unit communicates through a first base station, and the unit monitors the pilot signal strength of the base station in the Active Set and the Neighbor Set. When a pilot signal of a base station in the Neighbor Set exceeds a predetermined threshold level, the base station is added to the Candidate Set and removed from the Neighbor Set at the communication unit.

The communication unit communicates a message identifying the new base station. The base station controller decides whether to establish communication between a new base station and the communication unit. Should the base station controller decide to do so, the base station controller sends a message to the new base station with Identifying Information about the communication unit and a command to establish communications.

When the communication unit is communicating with multiple base stations, it continues to monitor the signal strength of base stations to determine which base station to connect to in the event of a signal strength degradation.

Each base station has a coverage area that has two handoff boundaries. A hand off boundary is defined as the physical location between two base stations where the link would perform the same regardless of whether the mobile unit were communicating with the first or second base station. Each base station has a forward link hand off boundary and a reverse link hand off boundary.

The forward link "handoff boundary is defined as the location where the mobile unit's receiver would perform the same regardless of which base station it was receiving. The reverse link handoff boundary is defined as the location of the mobile unit where two base station receivers would perform the same with respect to that mobile unit. Ideally these boundaries should be balanced, meaning that they have the same physical location with respect to the base station. If they are not balanced, system capacity may be reduced as the power control process is disturbed or the hand off region unreasonably expands.

In any of these conventional systems, the soft handoff between base stations still require the active base station to maintain contact with the base station controller as it hands off communication to a neighboring base station or a candidate base station. Upon handing over communication, the new base station (now active base station) resumes communication with the mobile unit via the base station controller. The conventional system described in FIG. 1 or FIG. 2 does not allow each base station to communicate with the other during a handoff since all communication has to go through the base station controller. This takes time, and in a data traffic transmission it can be costly.

Therefore, it is desirable to have a system and a method for transmitting CDMA calls including voice and data over a communication pathway with a higher bandwidth. It is further desirable to have a CDMA system that handles the transmission of calls, especially data calls, without the inherent call quality degradation. A need further exists for an improved and less costly system which improves efficiency and the transmission rate and time of calls between a mobile unit and a base station, between base stations and a base station controller, and between adjacent base stations.

SUMMARY OF THE INVENTION

The present invention is directed to a system and a method for providing an enterprise in-building or campus-wide IP based code division multiple access (CDMA) wireless system. The present invention is capable of handling both voice and data transmission within the CDMA system without the inherent delays and signal quality degradation encountered by conventional CDMA systems. The present invention further provides a system which does not require a dedicated end-to-end communication link when a communicating communication unit initiates or receives a call. This therefore provides a less costly and more efficient way of transmitting data over a CDMA wireless at burst rates higher than conventional CDMA systems.

The invention includes an integrated wireless internet base station (WIBS) which is connected to the internet and an existing networking infrastructure within an office building or campus. The wireless base station utilizes known ethernet transmission protocols to transmit data over an ethernet back-bone to various wireless communication devices within a building. The wireless base station further includes a call processing module which is capable of determining whether a call originating from or received by the base station to and from a communication unit is either a voice or a data call. The WIBS also integrates the base station control functions of the prior art to reduce call setups between a communication unit and the WIBS, and call handoffs between multiple WIBSs.

The invention further includes an integrated wireless internet server (WIS) which includes a base station controller module and a mobile switching module. The wireless server manages all calls processed by the base station. In the present invention, because the base station controller functions and the base station functions are integrated in the WIBS and connected to the ethernet back-bone, the base station does not have to send its signals over a long communication link to connect to a communicating communication unit. The integration of the base station controller and the base station further reduces call set-up time between a communicating communication unit and a mobile switching controller.

The wireless server also includes an ethernet protocol interface module to enable the server to communicate over the ethernet back-bone, and communicates over the back-bone and the internet using known ethernet and IP protocols. Since the ethernet back-bone uses a communication protocol different from the communication units, data received by the base station is packetized during processing into a format compatible with the ethernet transmission protocol of the ethernet back-bone and also to the internet.

The invention further includes a gateway which includes formatting logic to reformat data generated by the base station over the ethernet back-bone into a format compatible with the public switch network. A router is also connected to the ethernet back-bone to allow the WIBS to send and receive data over the internet or an intranet.

The present invention further includes connection logic which allows multiple WIBSs in the system to communicate with each other during a soft handoff of communications between a mobile unit and a WIBS. By enabling adjacent WIBSs to communicate during a soft handoff, the present invention reduces the time it takes to implement soft handoffs in a CDMA system and further reduces potential data loss due to such handoffs.

The present invention further provides an implementation advantage over the prior art by allowing inter-network communication between the wireless office communication system of the present invention and other mobile networks on the PLMN. The inter-networking communication of the present invention is implemented over an ANSI-41D using the ethernet transport protocol of UDP IIP or TCP IIP transport protocol via an ethernet interface to the ethernet back-bone of the system. The use of the ethernet interface is less costly than the prior art and further allows easy and flexible connectivity to existing in-office, building, or campus networks.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention maybe practiced without these specific details. In other instances, well-known methods, procedures, components, and circuits have not been described in detail so as not to unnecessarily obscure aspects of the present invention.

The invention is directed to a system, an architecture, a subsystem, and a method to manage a wireless CDMA data connection in a way superior to the prior art. In accordance with an aspect of the invention, a base station allows CDMA call coverage within a building without requiring a dedicated and a lengthy end-to-end transmission.

In the following detailed description of the present invention, a system and method for a wireless internet protocol based communication system is described. Numerous specific details are set forth in order to provide a thorough understanding of the present invention. However, it will be recognized by one skilled in the art that the present invention may be practiced without these specific details or with equivalents thereof.

Figure 1:
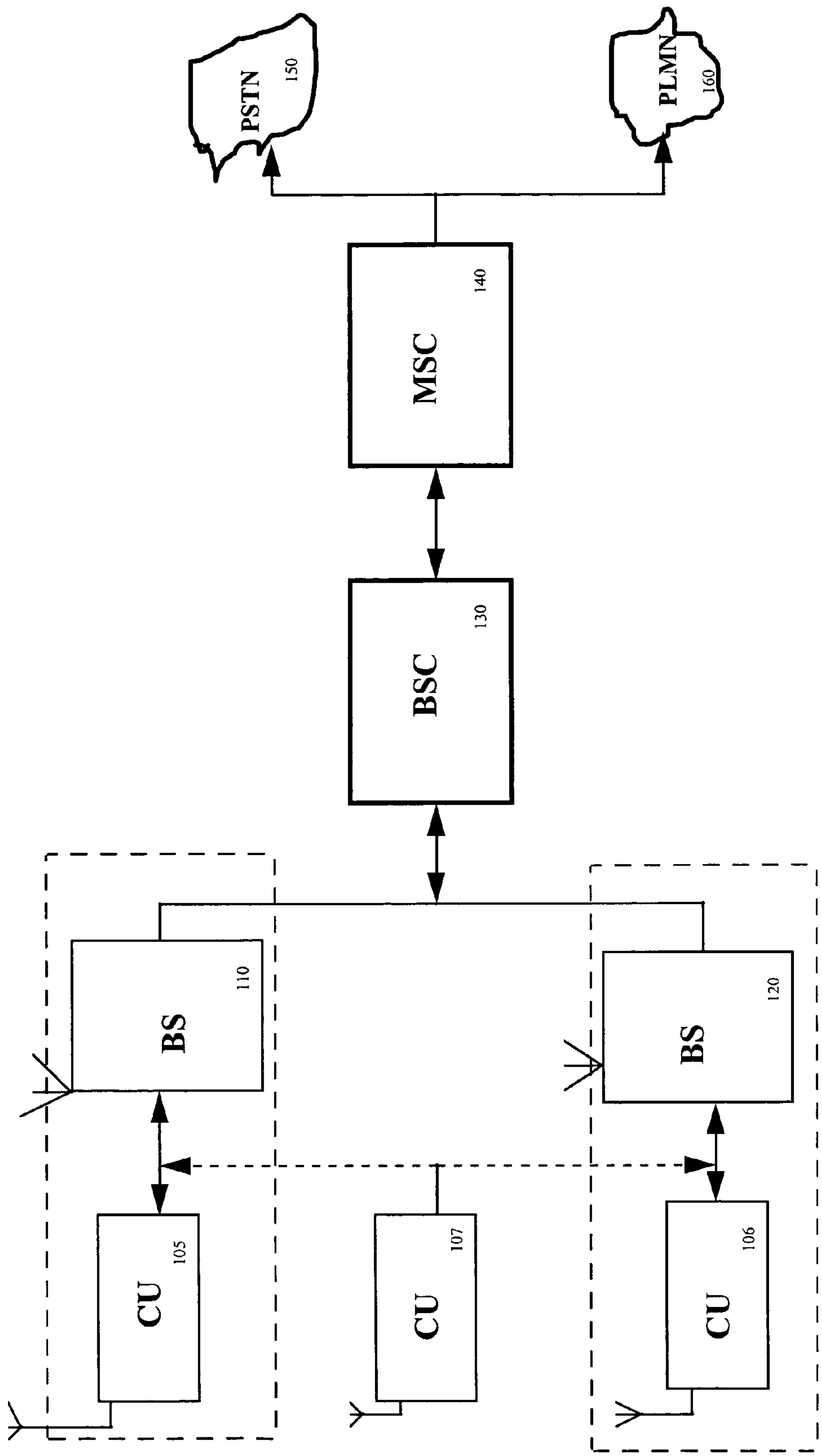
FIG. 1 is a block diagram of a conventional CDMA system.
Figure 1B:
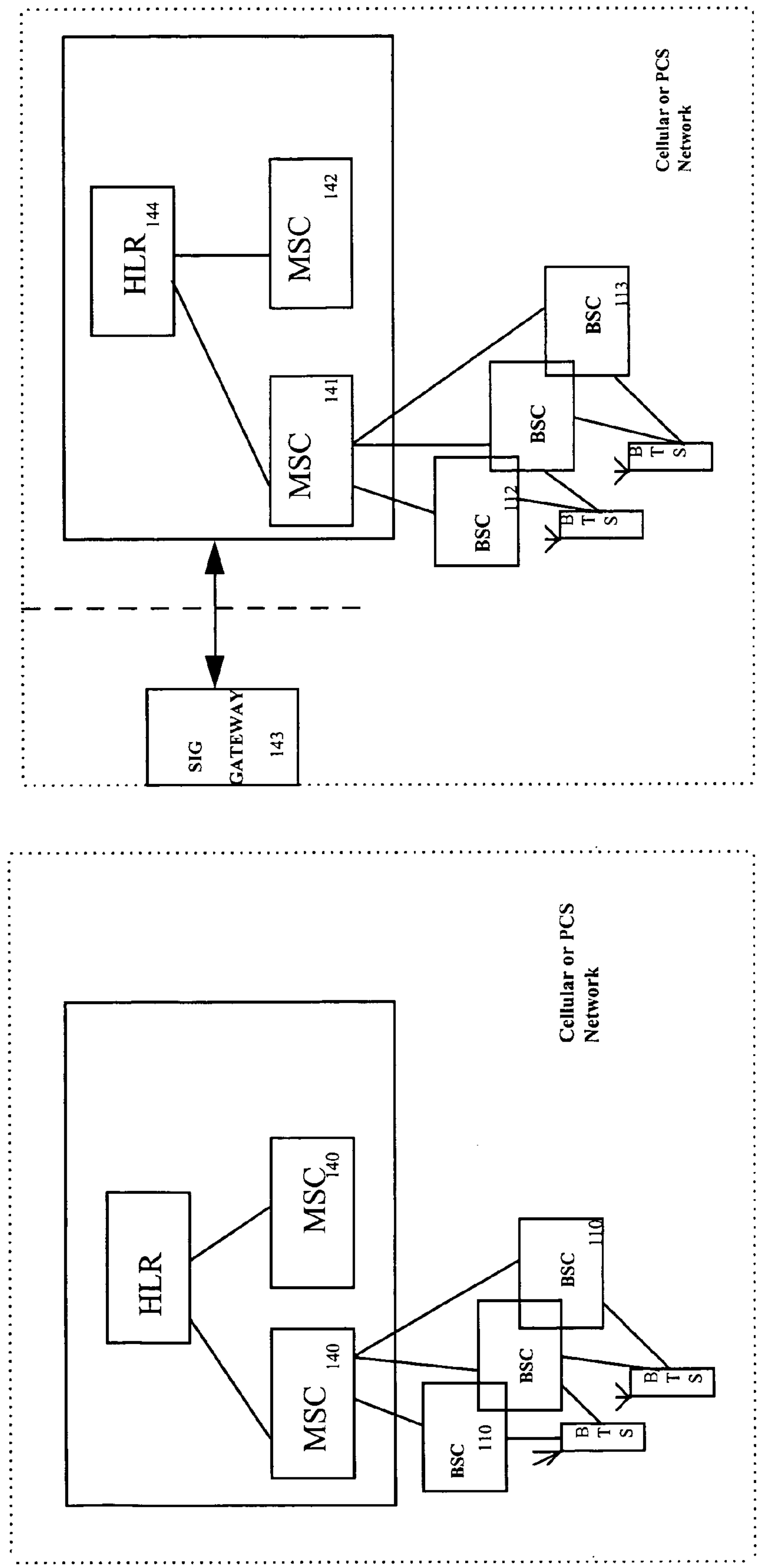
FIG. 1B is a block diagram of an implementation of the public land mobile network.
Figure 2:
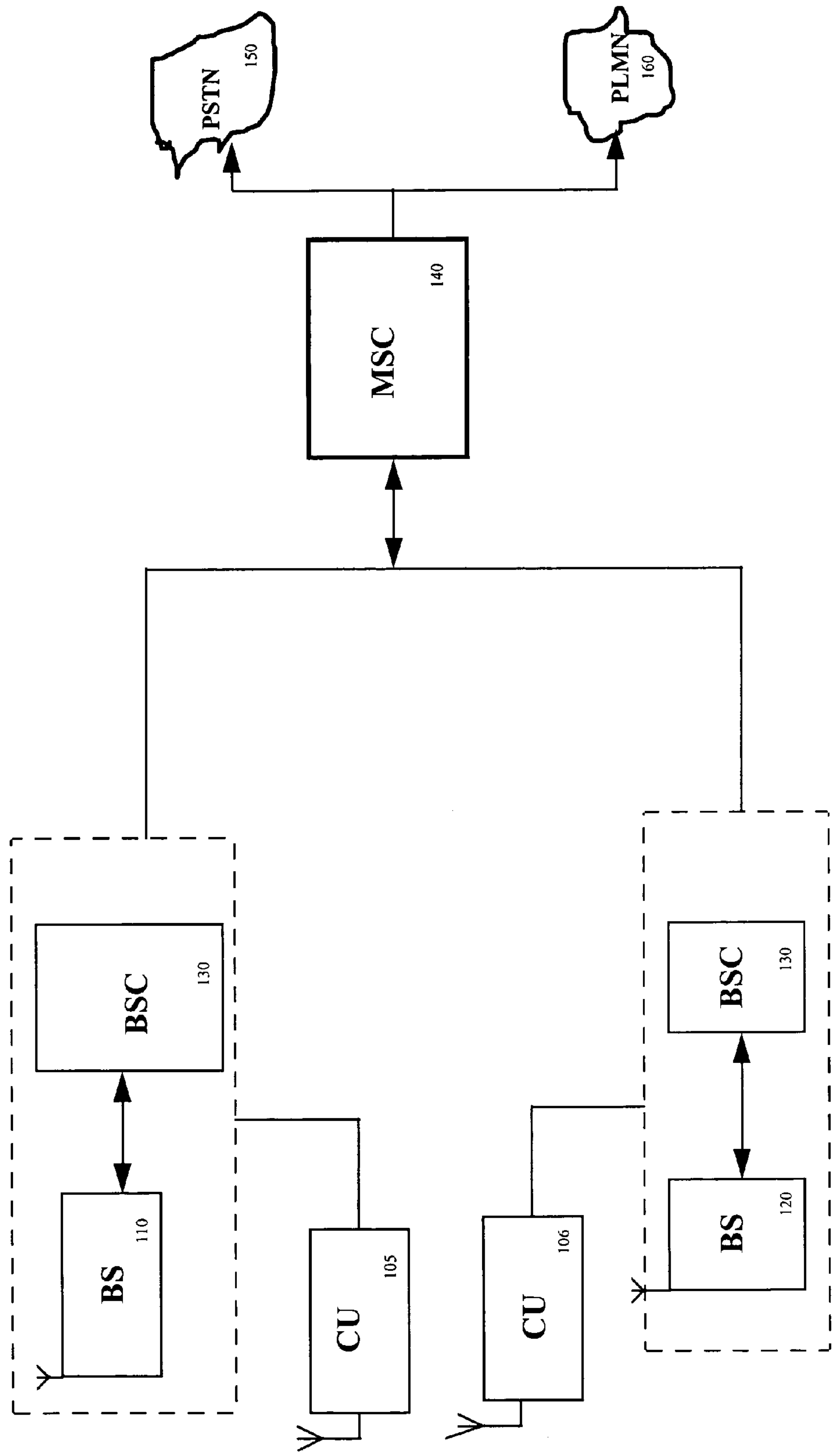
FIG. 2 is a block diagram of a conventional multiple carrier CDMA system.
Figure 3:
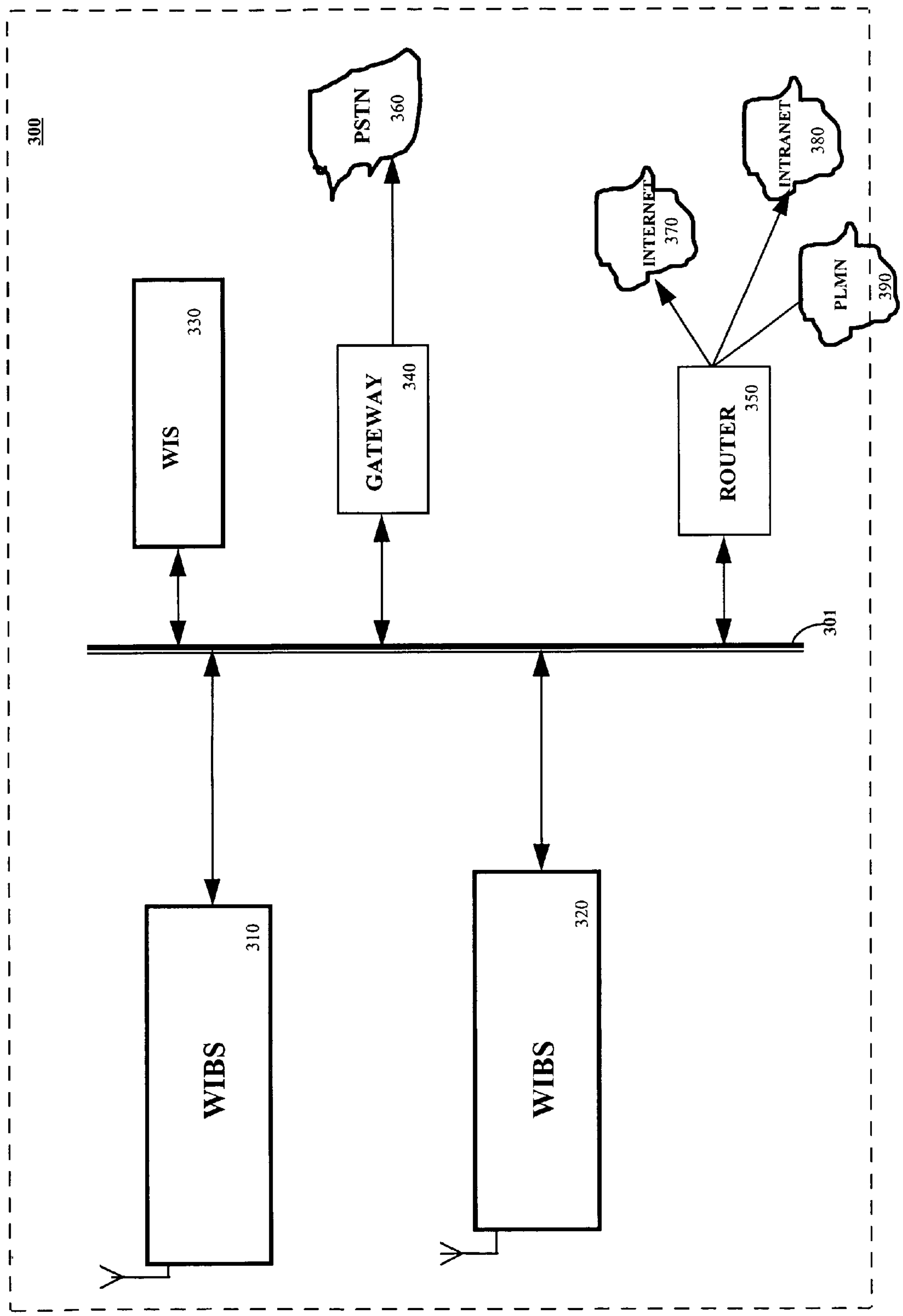
FIG. 3 is a block diagram of an embodiment of a wireless CDMA communication system of the present invention.

Generally, an aspect of the invention encompasses providing an integrated wireless internet protocol based in-building or campus-wide CDMA communication system which provides a wide range of voice, data, video, and other services in conjunction with a private branch exchange interfaced to the Public Switched Telephone Network (PSTN) and the Public Land Mobile Network (PLMN). The invention can be more fully described with reference to FIGS. 3 through 6. FIG. 3 is a functional illustration of the wireless system of the present invention. Wireless Office Solution system 300 (WOS) comprises one or more mobile or wireless communication units 301–303, an enterprise local area network (LAN) 310, a wireless internet base station (WIBS) 320 coupled to an ethernet back-bone of the LAN 310, a wireless internet server (WIS) 330 also coupled to the ethernet backbone of LAN 310, a communication gateway 340 coupled to 310 and the public switch telephone network (PSTN), and a communication router 350 which couples to LAN 310 and the internet or an intranet between office buildings.

Although the embodiment described above has been described with reference to one WIBS, the present invention is adaptable to handle one or more WIBSs. Furthermore, the present invention is adaptable to have one or more WIBSs coupled to the ethernet back-bone.

WOS 300 preferably is adapted to function with a code division multiple access (CDMA) wireless technology. However, the present invention is adaptable equally to a time division multiple access (TDMA) system and to other applicable wireless technologies.

Still referring to FIG. 3, WIBS 310 is an IP based system which enables WOS 300 to take advantage of existing networking infrastructure in an office building or a similar environment to communicate wireless calls from the mobile units to other wireless devices on the network, internet, or to the PSTN. WIBS 310 includes switching functions to process traffic from various sources such as voice and data for delivery over the ethernet back-bone. Integration of base station controller and mobile switch controller functions enables WIBS 310 to manage and coordinate radio resources to effect operations such as call origination, terminations, and handoffs.

WIBS 310 further provides interface between a CDMA PCS or a cellular mobile communication system and the WIS 320 to enhance mobility within a wireless office environment covering hot spots or dead spots in traditional public cellular or PCS networks such as on-campus, or the load etc. could not address.

WIBS 310 is coupled to the ethernet back-bone preferably through a 10/100 base-T interface and related software stack to handle data bursts on the LAN that traditional CDMA systems could not handle. WIBS 310 receives and sends data to and from cellular regions to other subscription units in the WOS. WIBS 310 receives radio signals from mobile units and packetizes the contents of the signals into data packets that are delivered over the ethernet back-bone to various destinations such as the PSTN and the internet.

Still referring to FIG. 3, WOS 300 further includes a wireless internet server (WIS) 340 which couples to ethernet back-bone 301 to provide directory registry functionality to mobile units communication with WOS 300. In the preferred embodiment of the present invention, WIS 340 integrates both base station controller and mobile switch controller functionality to enable WIS 340 to manage calls received by WOS 300.

Referring still to FIG. 3, gateway 340 is coupled to the ethernet back-bone 301 to receive converted voice signals with WOS 300 from WIBS 310 for delivery to the PSTN. In the present invention, gateway 340 preferably is a PSTN or Trunk gateway manufactured by Cisco® systems.

Router 350 is also coupled to the ethernet back-bone 301 to receive and deliver data packets from WIBS 310 to mobile units coupled to the internet or intranet requiring data traffic from WIBS 310. In the preferred embodiment, router 350 may be any of the routers manufactured by CISCO® systems.

Figure 4:
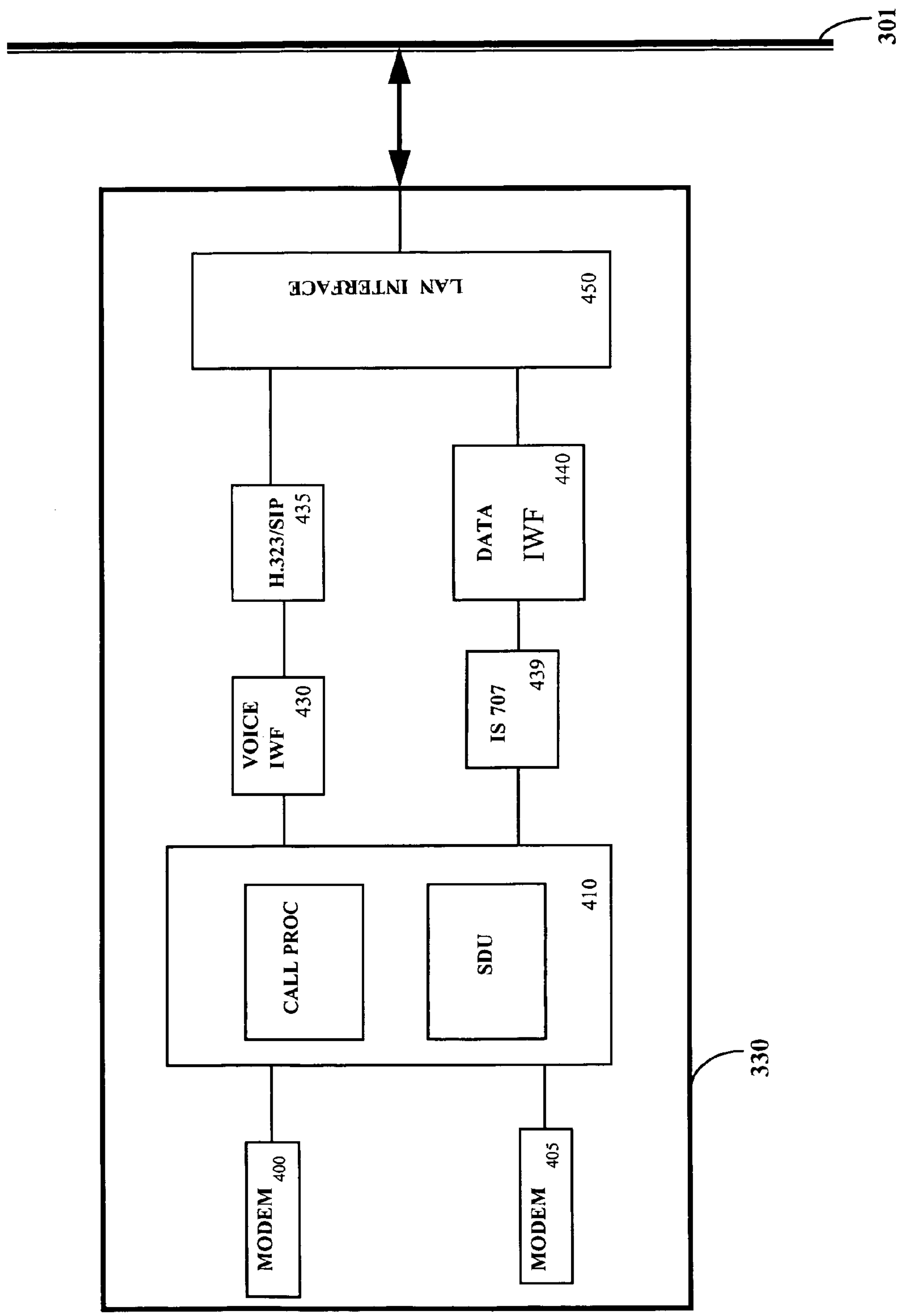
FIG. 4 is a block diagram of an embodiment of the wireless base station of the present invention.

Referring to FIG. 4, a functional block diagram of the wireless internet base station is illustrated in WIBS 310. The WIBS 310 is comprised of a LAN interface which couples to the ethernet back-bone for communication with other subsystems in WOS 300. The LAN interface couples data converted by WIBS 310 to the other subsystem via interface 450 to the internet.

WIBS 310 further comprises call processing module 410 which includes call processing logic 411 and call selection and distribution logic 412. Calls received by WIBS 310 from mobile units, for example 301, are processed by call processing logic and provided to call selection and distribution unit logic 412 for transmission over to the LAN to other subsystems in WOS 300.

In the present invention, WOS 300 may include a plurality of WIBS. In the case where the WOS has multiple WIBS, each WIBS has a coverage area over the LAN with typically two hand off boundaries. The hand off boundary defines the physical locations between two WIBSs coupled to the ethernet back-bone where a mobile communication unit link would perform in the same manner regardless of which WIBS it was receiving.

The WIBS has a forward and reverse link boundary similar to the prior art. The forward link is defined as the location where the mobile communication unit's receiver would perform the same regardless of which WIBS it was receiving. The reverse link handoff boundary is defined as the location of the mobile communication unit where two WIBS receivers would perform the same with respect to that mobile unit.

In the WIBS 310 of the present invention, the call selection distribution unit logic 412 is integrated into the call processing module 411 to handle call handoffs. In most CDMA systems, the path loss of signal is extremely dynamic, especially when the mobile unit is at the boundary of multiple cells. The signal path to the communication unit from a base station could fluctuate a lot. For example, in FIG. 4B the signal path of base station 1 to the mobile unit may be better than the signal path from base station 2 to the communication unit. But all this could change in a few milliseconds in which the signal strength of base station 2 becomes better than that of base station 1.

The signal conditions over the RF frequency band also change dynamically and instantaneously. In order to select the better signal path from the mobile communication unit and multiple base stations, the CDMA system typically incorporates a signal selection and distribution functions.

In most conventional CDMA systems, the SDU is in the base station controller. In this system, during a reverse link, the SDU performs a selection function by receiving voice packets from the mobile communication unit from two or more different base stations. The SDU selects the packet with the best reception and transmits it. This selection process is continuously performed every 20 milliseconds, 50 times per second.

During a forward link, the SDU performs a distribution function by simply distributing the same voice packets into multiple base stations. The base stations will send the same voice packets and the mobile communication unit performs the selection of voice packets transmitted from the multiple base stations.

Earlier systems integrate the SDU functions in the base station controller because it was the first concentration point of voice paths from the mobile units via multiple base stations. Since these earlier systems do not allow direct communications between base stations, it takes a few milliseconds for the mobile units to handoff to adjacent base stations, especially during soft handoffs.

However, in the present invention, WIBS 310 incorporates the functions of earlier base station controllers (BSCs) and mobile switch controllers (MSCs), connecting multiple WIBSs to the LAN communicating directly with each other to eliminate the time lost during soft handoffs between the mobile unit and the WIBS.

Figure 4B:
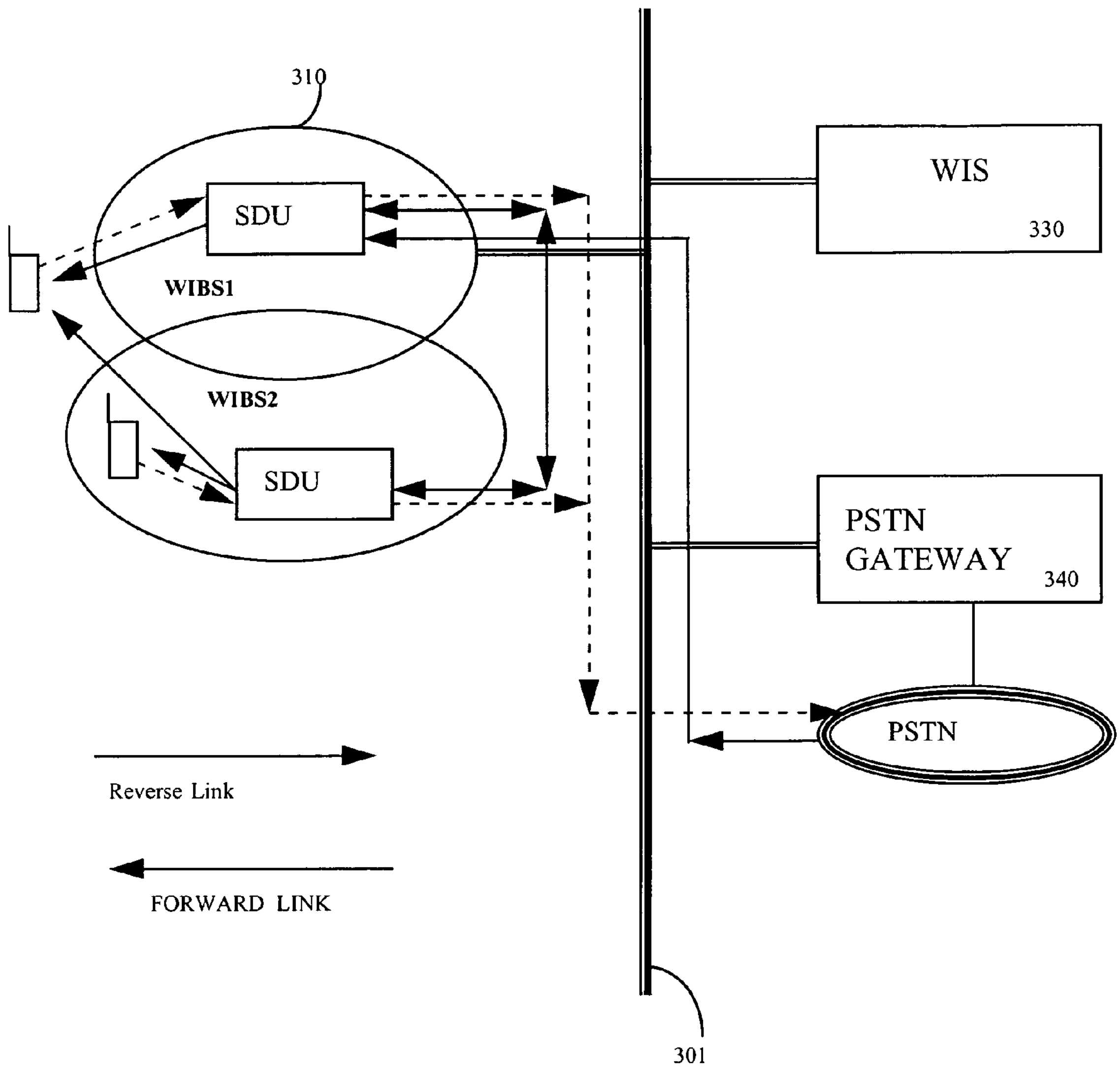
FIG. 4B is a block diagram of an embodiment of call handoffs between multiple wireless base stations of the present invention.

Still referring to FIG. 4, the WIBS where the mobile unit initiates a call is called the anchor SDU (e.g. WIBS1 in FIG. 4B). The anchor SDU performs the call selection and distributions of voice packets for the duration of the call for that particular mobile unit. Communication received from the mobile unit is processed and packetized for transmission over the ethernet back-bone via LAN interface 450 to provide for delivery of the CDMA data. Incoming calls are processed and provided to a plurality of interworking function modules (IWFs) 420, 440. Communication between the interworking function modules and the mobile unit is provided via ethernet back-bone 301.

During a call selection sequence, the SDU receives multiple copies of the same packets of information from the same communication unit via multiple WIBSs. As shown in FIG. 4B, when the communication unit moves to the boundary area between WIBS1 and WIBS2, the anchor WIBS (e.g. WIBS1) detects this movement and requests WIBS2 to start send and receive packets. During a soft handoff, both WIBS1 and WIBS2 receive packets from the communication unit which includes packet quality measurement information and data time stamps. These packets are then routed to the anchor SDU for the selection process to begin.

When the communication unit moves deep into the coverage area of WIBS2, the anchor SDU requests the receiver in WIBS1 to stop processing the packets from the communication unit. This results in dropping the path of communication between the communication unit and WIBS1. However, WIBS still continues to receive packets from WIBS2 even though there is no active communication between the communication unit and WIBS1.

In the present invention, incoming voice traffic from the communication unit is processed and delivered via IWF 420 to the LAN. IWF 440 couples to call processing module 410 to convert in-coming into IP data packets for delivery over the LAN to other data receiving wireless or communication units connected to the LAN. IWF 440 provides the respective interworking of speech signals into IP protocol packets which are delivered as CDMA data to LAN interface 450 for delivery to other subsystems in WOS 300 via the ethernet back-bone. By having both a voice and data IWF, the present invention is able to receive voice and data calls and interweave these calls for delivery over the LAN from a single mobile call.

Still referring to FIG. 4, WIBS 310 further includes a plurality of CDMA modems coupled to modulate and demodulate calls within the WIBS. CDMA modems 400–405 include receiver logic and tracking logic for receiving and tracking incoming messages from mobile units. In the modem, one or more modulators perform spread-spectrum spreading code sequence generation. In addition, the modems generate, for example, a pseudoniose (PN) sequence and perform complex modulation to produce signals generated and transmitted with the mobile unit's pilot signal. The CDMA modems 400–405 demodulate and despread signals according to well known CDMA techniques.

Figure 5:
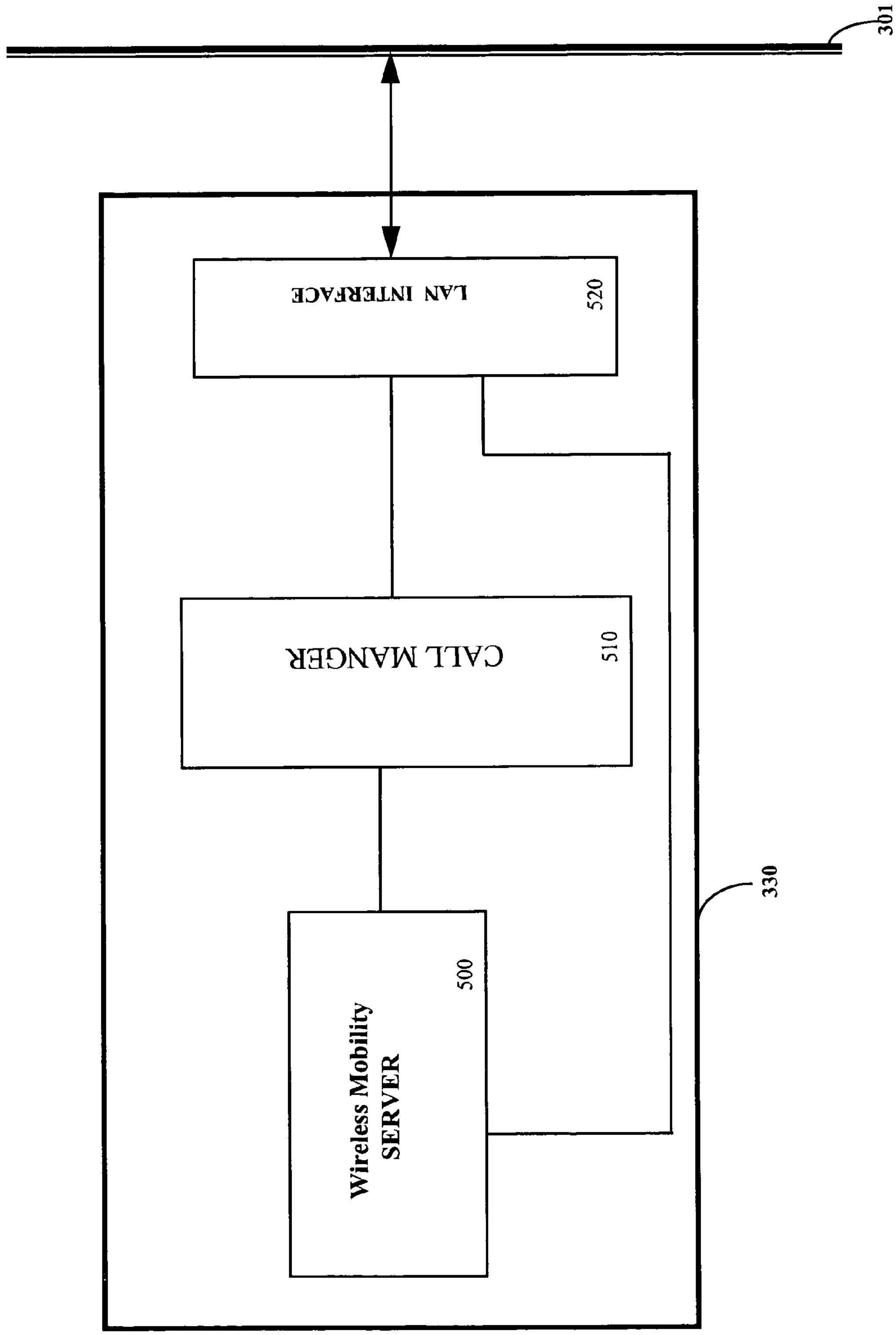
FIG. 5 is a block diagram of an embodiment of the wireless server of the present invention.

Referring now to FIG. 5, a functional block diagram of the wireless internet server is illustrated for WIS 330. WIS 330 comprises a LAN interface 520 which couples WIS 300 to the ethernet back-bone to provide call management functions to subsystems within WOS 300.

WIS 330 further includes a wireless mobility server (WMS) 500 which provides call control and mobility management for calls received by WIBS 310. WMS 500 includes mobile user profile information registry and WIBS information registry. WIS 330 further provides mobile switching functions and maintains directories of the WIBS connected to the LAN to enable mobile units communicating to the WOS 300 to locate a WIBS.

WIS 330 further includes a call manager module which includes structure logic that establishes, maintains, and removes calls from the WOS 300 subsystem. The call manager module further provides base station control functions which provides real time call processing functionality to WOS 300. The call manager performs signaling interface of radio resource management (i.e. channel allocation) and coordination of call resources such as call origination, termination, and handoffs.

Figure 6:
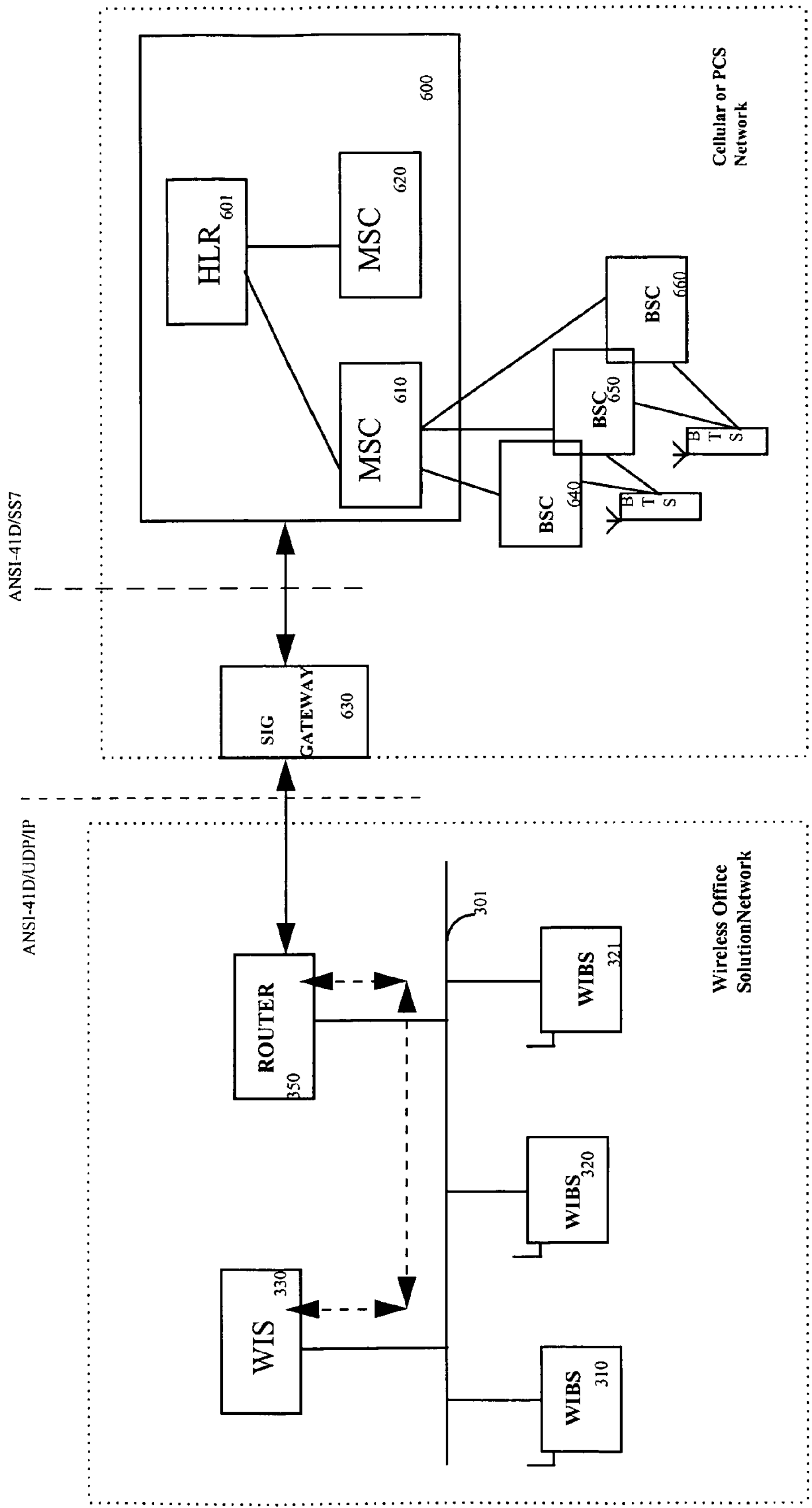
FIG. 6 is a block diagram illustrating an embodiment of an inter-network communication implementation between the wireless server of the present invention and the public land mobile network.

FIG. 6 is a block diagram illustrating one embodiment of the advantages of the present invention. As described earlier, prior art CDMA systems implement an ANSI:.41D protocol on top of an SS7 transport protocol for inter-network communications between two different mobile networks. The present invention, as shown in FIG. 6, implements an ANSI-41D protocol utilizing a UDP/IP or TCP/IP transport protocol between WOS 300 and other networks on the PLMN.

WIS 300 is equipped with a low cost ethernet interface card which enables WOS 300 to utilize the existing ethernet transport protocol to allow inter-networking communication without the use of the costly SS7 interface cards. By using existing in-building network connections, the present invention provides the flexibility of configuration and use in the exchange of service profile information between networks which the prior art did not provide.

Figure 7:
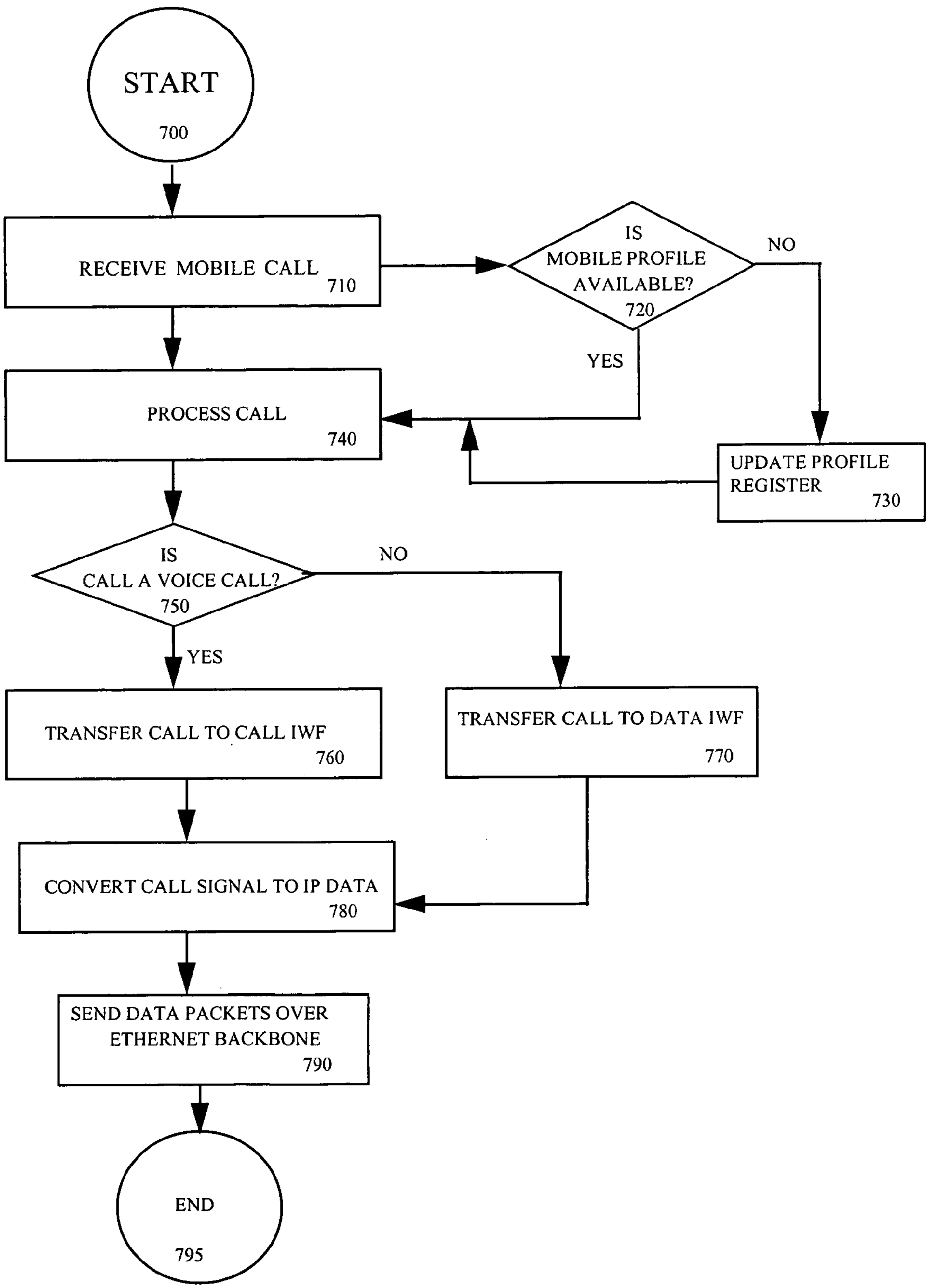
FIG. 7 is a flow diagram of a call request and processing method of one embodiment of the present invention.

Referring to FIG. 7, a flow diagram of one embodiment of the 700 processing of calls initiated by a mobile unit to WOS 300 is illustrated. As shown in FIG. 7, a mobile call processing is initiated at step 710 when the WOS receives the mobile call. At step 720, WIS 330 determines whether the transmitting mobile unit's profile information is stored in WOS 300. If the mobile profile information is available, processing continues at step 740. If on the other hand, a transmitting mobile unit's profile information is not available in WOS 300, WIS 330 updates 730, its profile registers, and the call processing continues at step 710.

If a transmitting mobile unit's profile information is identified in WIS 330, WIBS 310 checks to see if the transmitting request is a voice or a data request at step 750. If the transmitted request is a voice request, processing continues at step 760 where the received call is processed by call IWF 440. If the received call is a data call, the call is provided to data IWF 440 for processing.

Data received from IWF 430 and IWF 440, respectively, are converted internally by WIBS 310 into IP protocol format packets at processing steps 780 and 790 over the ethernet back-bone to either gateway 340 or router 350. Processing of the incoming call ends at step 795 after WIBS 330 has delivered the processed call to the ethernet.

Figure 8:
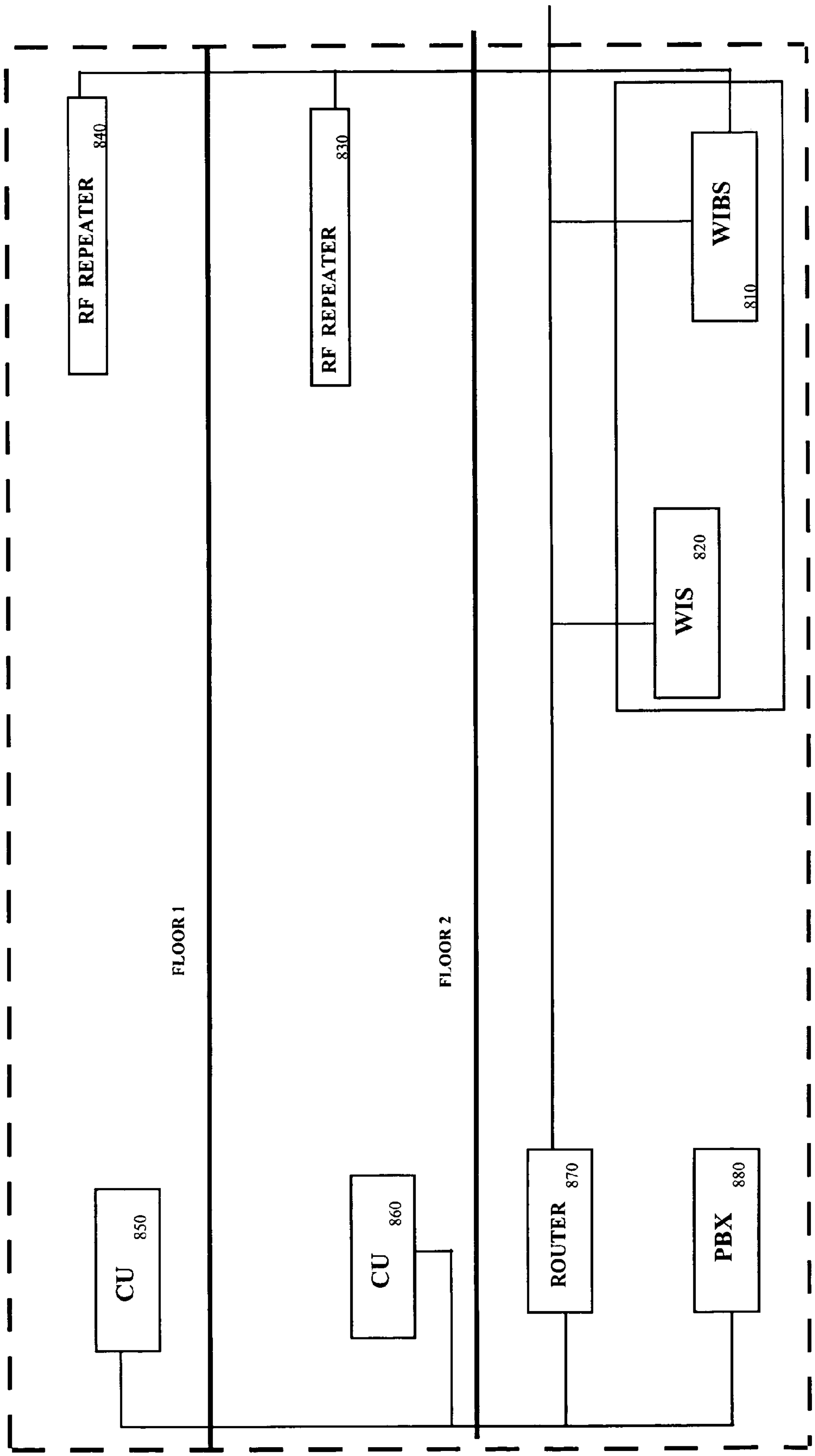
FIG. 8 is a block diagram of an exemplary implementation of one embodiment of the present invention within an office building.

FIG. 8 is a block diagram illustration of one embodiment of an implementation of the present invention in an office building. As shown in FIG. 8, the implementation includes a plurality of WIBSs connected to a WIS which couples to the ethernet back-bone. The implementation further includes a plurality of repeaters to enable a wider horizontal and vertical coverage within a building. The use of repeaters is very important since prior art systems have difficulties transmitting signals vertically within buildings and also have limited horizontal in-building coverage. By using these repeaters, the present invention is able to provide a clear and distinct signal quality anywhere within a building.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to enable others skilled in the art to best utilize the invention and various embodiments with various modifications that are suited to the particular use contemplated. It is intended that the scope of the invention be defined by the claims appended hereto and their equivalents.

What is claimed is:

1. An in-office wireless code division multiple access, CDMA, communication system, comprising:

a local area network, LAN, having an ethernet communication back-bone;

a plurality of CDMA wireless base stations coupled to said ethernet communication back-bone;

a wireless internet server coupled to said ethernet communication back-bone;

a plurality of wireless communication devices coupled to said CDMA wireless base stations, wherein the CDMA wireless base stations are operable to negotiate a handoff of a connection with one of the wireless communication devices from a first CDMA wireless base station to a second CDMA wireless base station using the ethernet communication back-bone;

a communication gateway coupled to said ethernet communication back-bone;

a router coupled to said ethernet communication backbone to enable said communication devices to communicate to the internet; and a plurality of repeaters coupled to said ethernet back-bone and operable to repeat signals from the wireless communication devices to increase ranges of the CDMA wireless base stations;

wherein negotiating the handoff of the connection from the first CDMA wireless base station to the second CDMA wireless base station is based on the increased ranges of the CDMA wireless base stations when the signals from the wireless communication devices are being repeated.

2. The system as recited in claim 1, wherein said wireless base station includes a plurality of CDMA wireless modem modules for providing a communication link to external wireless communication devices to the in-office wireless communication system.

3. The system of claim 2, wherein said wireless base station further includes a call processing module for processing calls received and originated from said wireless base station.

4. The system of claim 3, wherein said call processing module formats call signals received by said wireless base station into data packets adaptable for the ethernet communication back-bone.

5. The system of claim 3, wherein said wireless base station further includes an inter-networking processing module for providing a communication channel between the internet and a wireless communication unit coupled to said ethernet communication back-bone.

6. The system of claim 5, said wireless internet server includes an integrated base station controller module and a mobile switch controller module for managing calls between communication units within the system.

7. The system of claim 1, wherein said wireless internet server includes a wireless mobility module for managing mobile units within the system.

8. The system of claim 1, wherein said wireless internet server provides real-time call processing.

9. The system of claim 1, wherein the wireless internet server includes a call manager processing module for managing calls received and calls originated from the in-office wireless communication system.

10. A wireless office communication solution system, comprising:

an ethernet communication pathway;

a plurality of wireless base stations coupled to said ethernet communication pathway to receive and originate wireless communication traffic over said communication pathway, wherein the wireless base stations are operable to negotiate a handoff of a connection with a wireless communication device from a first wireless base station to a second wireless base station using the ethernet communication pathway;

a wireless internet server coupled to said communication pathway to receive and manage wireless communication traffic over said communication pathway; and a plurality of repeaters coupled to said communication pathway and operable to repeat signals from the wireless communication device to increase ranges of the wireless base stations;

wherein negotiating the handoff of the connection from the first wireless base station to the second wireless base station is based on the increased ranges of the wireless base stations when the signals from the wireless communication device are being repeated.

11. The system of claim 10, further including a communication gateway coupled to said communication pathway for providing communication formatting logic for transmitting a wireless call generated in the wireless base station to a public switch telephone network system.

12. The system of claim 10, wherein the wireless base station includes call selection modules for determining whether a call received or originated from the wireless base station is a voice call or a data call.

13. The system of claim 10, wherein the wireless base station includes a call processing module for formatting wireless calls received by the wireless base station into formats adaptable for transmission on the ethernet communication pathway.

14. The system of claim 10, wherein the wireless base station further includes a communication interface for providing communication protocols to enable the wireless base station to communicate over the ethernet communication pathway.

15. The system of claim 10, wherein the wireless base station further includes a plurality of inter-networking functional modules for providing a communication channel between the wireless base station and the internet.

16. The system of claim 10, wherein the wireless internet server includes call manager modules for handling calls processed by the wireless base station for transmission over the ethernet communication pathway.

17. The system of claim 16, wherein the wireless internet server further includes a communication interface module for providing communication protocol to allow the wireless internet server to communicate over the ethernet communication pathway.

18. A code division multiple access, CDMA, communication system having a plurality of integrated wireless base stations, WIBS, having an integrated base station controller and a mobile switch controller function, the WIBS comprising:

a plurality of CDMA modems coupled to modulate and demodulate radio signals provided to said WIBS by a mobile communication unit;

a call processing module coupled to receive and process calls by said WIBS;

a plurality of interworking function modules coupled to said call processing module to process voice and data calls received by said WIBS; and a network interface unit coupled to said plurality of interworking function modules to format calls processed in said WIBS for delivery over an ethernet back-bone, wherein the CDMA modems are further operable to negotiate a handoff of a connection with the mobile communication unit from a first CDMA modem to a second CDMA modem using the ethernet backbone based on increased ranges of the WIBS when signals from the mobile communication unit are being repeated by repeaters coupled to said ethernet backbone.

19. The WIBS of claim 18, wherein the call processing module includes call processing logic for processing calls received by the WIBS.

20. The system of claim 19, wherein the call processing module further includes call selection and distribution logic for selecting and distributing calls to and from a mobile unit to the WIBS during a forward link and a reverse link.

21. The system of claim 20, wherein the call selection and distribution logic enables the WIBS to communicate with other WIBSs coupled to the communication system.

22. The system of claim 18, wherein the plurality of IWFs includes a call IWF for handling voice calls received by the WIBS.

23. The system of claim 18, wherein the plurality of IWFs includes a data IWF for handling data calls received by the WIBS.

24. The system of claim 18, wherein the network interface module packetizes calls processed by the WIBS into data packets adaptable for transmission within an internet protocol transmission medium.

25. The system of claim 18, wherein the plurality of modems receive CDMA data.

26. A wireless office communication solution system, comprising:

an ethernet communication pathway;

a plurality of wireless base stations coupled to said ethernet communication pathway to receive and originate wireless communication traffic over said communication pathway, wherein the wireless base stations are operable to negotiate a handoff of a connection with a wireless communication device from a first wireless base station to a second wireless base station using the ethernet communication pathway;

a wireless internet server coupled to said communication pathway to receive and manage wireless communication traffic over said communication pathway; and a plurality of repeaters coupled to said ethernet communication pathway and operable to repeat signals to increase ranges of the wireless base stations;

wherein negotiating the handoff of the connection from the first wireless base station to the second wireless base station is based on the increased ranges of the wireless base stations when the signals are being repeated.

27. The system of claim 26, further including a communication gateway coupled to said communication pathway for providing communication formatting logic for transmitting wireless calls generated in the wireless base station to a public switch telephone network system.

28. The system of claim 26, wherein the wireless base station includes cal selection modules for determining whether a call received or originated from the wireless base station is a voice call or a data call.

29. The system of claim 26, wherein the wireless base station includes a call processing module for formatting wireless calls received by the wireless base station into formats adaptable for transmission on the ethernet communication pathway.

30. The system of claim 26, wherein the plurality of repeaters provides a wider horizontal and vertical wireless in-building aerial coverage.

31. A method for communicating with wireless devices, comprising:

initiating a communication session between a wireless communication device and a first wireless base station coupled to a local area network (LAN) having an ethernet communication pathway;

repeating signals from the wireless communication device to increase a range of the first wireless base station;

negotiating a handoff of the communication session from the first wireless base station to a second wireless base station using the ethernet communication pathway based on increased ranges of the wireless base stations when the signals from the wireless communication device are being repeated; and handing off the communication session from the first wireless base station to the second wireless base station.

32. The method of claim 31, wherein the wireless communication device communicates wirelessly using code division multiplex access (CDMA).

33. The method of claim 31, further comprising:

providing the wireless communication device with access to the Internet using an inter-networking device coupled to the ethernet communication pathway; and maintaining the Internet access during the handoff of the communication session.

34. The method of claim 31, further comprising providing the wireless communication device with access to the public switched telephone network.

35. Logic embodied in a computer readable medium operable to perform the steps of:

initiating a communication session between a wireless communication device and a first wireless base station coupled to a local area network (LAN) having an ethernet communication pathway;

repeating signals from the wireless communication device to increase a range of the first wireless base station;

negotiating a handoff of the communication session from the first wireless base station to a second wireless base station using the ethernet communication pathway based on increased ranges of the wireless base stations when the signals from the wireless communication device are being repeated; and handing off the communication session from the first wireless base station to the second wireless base station.

36. The logic of claim 35, wherein the wireless communication device communicates wirelessly using code division multiplex access (CDMA).

37. The logic of claim 35, further operable to perform the step of:

providing the wireless communication device with access to the Internet using an inter-networking device coupled to the ethernet communication pathway; and maintaining the Internet access during the handoff of the communication session.

38. The logic of claim 35, further operable to perform the step of providing the wireless communication device with access to the public switched telephone network.

39. A system, comprising:

means for initiating a communication session between a wireless communication device and a first wireless base station coupled to a local area network (LAN) having an ethernet communication pathway;

means for repeating signals from the wireless communication device to increase a range of the first wireless base station;

means for negotiating a handoff of the communication session from the first wireless base station to a second wireless base station using the ethernet communication pathway based on increased ranges of the wireless base stations when the signals from the wireless communication device are being repeated; and means for handing off the communication session from the first wireless base station to the second wireless base station.

* * * * *